(12) United States Patent
Higginson (10) Patent No.: US 8,249,670 B2
(45) Date of Patent: *Aug. 21, 2012

(54) MAST-BASED DETACHABLE CONTROLLER DEVICE

(75) Inventor: Timothy B. Higginson, Highland Park, IL (US)

(73) Assignee: Yuvee Inc., Highland Park, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/152,769

(22) Filed: Jun. 3, 2011

(65) Prior Publication Data

US 2011/0230241 A1    Sep. 22, 2011

Related U.S. Application Data

(63) Continuation of application No. 12/406,659, filed on Mar. 18, 2009, now Pat. No. 7,974,663, which is a continuation of application No. 11/435,912, filed on May 17, 2006, now Pat. No. 7,509,152.

(60) Provisional application No. 60/681,931, filed on May 17, 2005.

(51) Int. Cl.
  *H04B 1/38* (2006.01)
(52) U.S. Cl. .................................... 455/575.1
(58) Field of Classification Search ............... 455/550.1, 455/556.1, 556.2, 575.1, 575.3, 90.1, 90.2, 455/90.3, 347, 351; 345/156, 157, 161
See application file for complete search history.

(56) References Cited

U.S. PATENT DOCUMENTS

| 6,563,488 | B1 | 5/2003 | Rogers et al. |
| 6,806,865 | B2 | 10/2004 | Oueslati et al. |
| 2004/0127268 | A1 | 7/2004 | Wong et al. |
| 2007/0273648 | A1 | 11/2007 | Fussinger |

OTHER PUBLICATIONS

Pilato, F. "Varatouch Announces Mini Analog Joystick for Mobile Devices," Mobile Magazine, Dec. 21, 2004 Retrieved from Internet <URL:http://www.mobilemag.com/content/100/102/C3512/>.
International Search Report for PCT/US06/19268 dated Sep. 25, 2007.
Written Opinion of the International Searching Authority dated Sep. 25, 2007.

*Primary Examiner* — Thanh Le
(74) *Attorney, Agent, or Firm* — Leydig, Voit & Mayer Ltd.

(57) ABSTRACT

A self-contained controller device for electronic devices is described herein. The controller device includes a fixed central mast that extends into the controller and acts as the core structural component for the controller. The controller's user movable casing is pivotally mounted about the mast with a pivot point where the user movable casing and the mast meet that is located at or above the surface of the electronic device. The internal components of the controller device include movement detection and measurement circuitry, a self-centering mechanism attached to the fixed central mast, and wires connecting the movement detection and measurement circuitry through the mast to device connection point(s) on the electronic device.

23 Claims, 8 Drawing Sheets

MAST-BASED DETACHABLE CONTROLLER DEVICE

CROSS-REFERENCE TO RELATED APPLICATION

This application claims priority of Higginson U.S. application Ser. No. 12/406,659, filed on Mar. 18, 2009, which claims priority to U.S. application Ser. No. 11/435,912, filed on May 17, 2006, which claims priority of Higginson U.S. provisional application Ser. No. 60/681,931 filed on May 17, 2005, entitled "Mast-Based Detachable Controller Device," the contents of which are expressly incorporated herein by reference in their entirety including the contents and teachings of any references contained therein.

AREA OF THE INVENTION

The present invention generally relates to physical user input devices, and more particularly, the invention relates to detachable controllers for software applications running a display located on a separate device.

BACKGROUND OF THE INVENTION

A critical issue in mobile, portable and handheld electronics device design is space constraints. For instance, mobile phones are designed to be very small, often measuring in the neighborhood of 3" H×2" W×1" D. Of that space (for instance, in an advanced clam-shell design phone that has a flip top with the screen on the inside of the top), the surface area for the physical user interface (such as numeric keys, directional toggle buttons and other controls) are required to fit in an area about 3" H×2" W or less. The internal space for the electronics is also exceedingly small, frequently measuring, for flip phones, less than 3" H×2" W×0.5" D.

Despite those tight space constraints, the phones have more and more features, functionality and services available on them. Mobile phones have essentially become mini, mobile wireless computers. Mobile phones not only make voice calls, but they also: play games; send text messages; store address books and calendars; offer calculator functions; take, store and send photos; and play music and video clips. New features are constantly being added. This means that the user interface must advance to make all this easily accessible to the user, at the same time that the space available for more sophisticated user interfaces and internal electronics remains static or even becomes smaller.

Advances in physical user interfaces must take into account the relatively limited interface area available on mobile devices, while at the same time providing a new and advanced level of physical control for all the new features available on these devices.

SUMMARY OF THE INVENTION

An improved joystick/controller provides users with the full control functionality of a joystick and mouse in an electro-mechanical design and interface that accommodates the intrinsically small internal and external space constraints of multi-functional mobile electronic devices. In embodiments of the invention, adding a single headphone jack size port or through the use of an existing port, any device (regardless of its small size or the density of the controls on its surface) is enabled with a sophisticated, detachable lever-type controller.

BRIEF DESCRIPTION OF THE DRAWINGS

While the claims set forth the features of the present invention with particularity, the invention, together with its objects and advantages, may be best understood from the following detailed description taken in conjunction with the accompanying drawing of which:

DETAILED DESCRIPTION OF THE DRAWINGS

Generally, the present invention relates to a controller device. The controller device has a fixed, core internal mast integrated with its male connector. This core internal structure (referred to herein as a "mast") provides the stability and connection point to a secondary device to which the input device is attached. As illustrated in the Figures, the mast is implemented at a vertical (90 degrees) from the top surface of the secondary device. In other implementations, partly depending on the ergonomics relation between the angle of the surface of the device and the joystick's vertical axis, an angle other than 90 degrees is used and may extend from a side surface.

Figure 1:
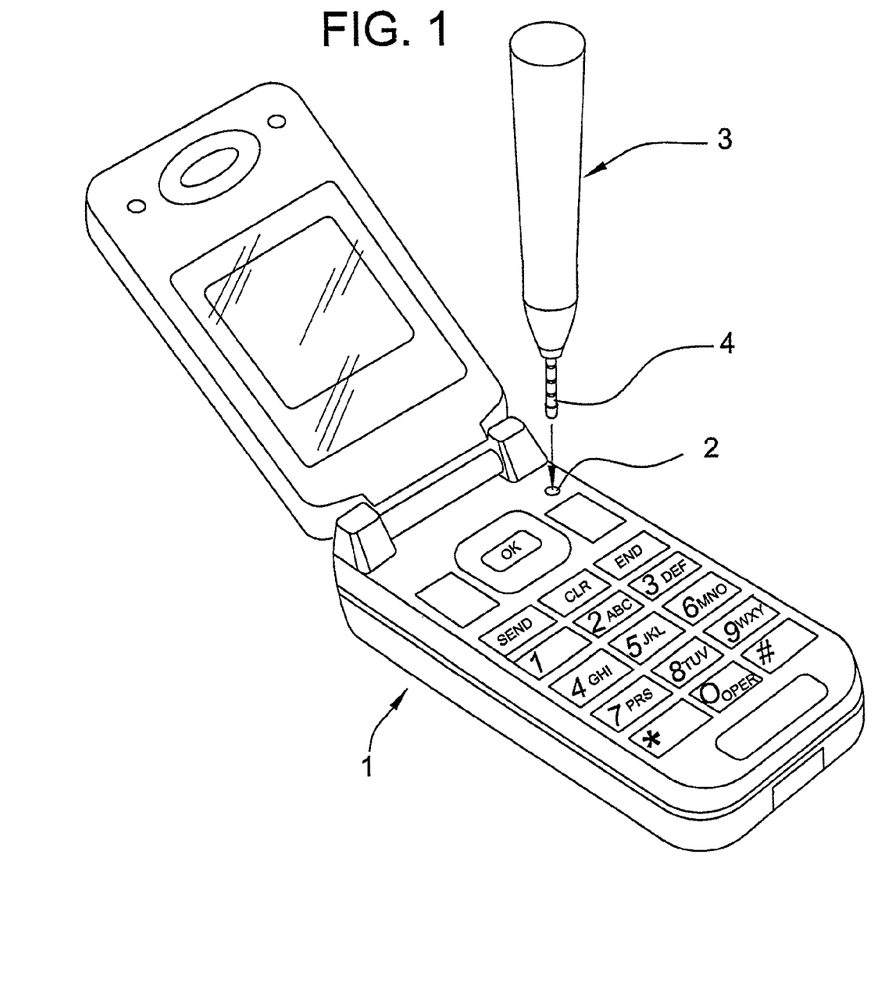
FIG. 1 is a side view of an exemplary controller detached from a secondary device.

FIG. 1 illustratively depicts an exemplary application of the present invention in a clam shell-style electronic device 1 (e.g., a cellular phone). The illustrated example includes a female connector opening 2 on a keypad-bearing surface of the electronic device 1 (e.g., a cell phone, PDA, etc.) into which a male connector 4 of a controller 3 is inserted. The small space requirements for the female connector opening 2 on the surface of the electronic device 1 and small, non-movable parts of the male connector 4 inserted into the female connector opening 2 of the electronic device 1 minimize impact upon the already constrained available space of small portable and mobile devices. In such devices the surface area is already almost fully committed to control surfaces such as keypads, directional buttons and other buttons or keys, and the internal volume/space of such devices is virtually completely filled and space for additional electronic components is severely limited. Further, moving parts (such as motion sensor surfaces) internal to the device 1, particularly mobile devices, that get a great of deal of hard use, create quality control, maintenance, support and return issues. The mast-based controller 4 utilizes only a small surface port (female connector opening 2) and a simple set of small and non-moving connectors making up a female connector 5 (see, FIG. 2) interface inside the electronic device 1.

The electronic device 1 is depicted in FIG. 1 in the form of a flip-type (clam shell) mobile phone. Alternatively, the device 1 is any device supporting execution of a variety of loadable and/or executable applications. By way of example, the device 1 is a laptop computer, a handheld computer, a personal digital assistant, a portable game player, a portable game player controller, a television/home entertainment/stereo remote control, a laptop/pc remote keypad or controller, a GPS device, an MP3 player, a portable DVD or movie or video player, and any device incorporating some combination of the foregoing functionality and form factors, among other consumer or commercial or defense electronic devices. It is further noted that the mast-based controller 3 is also advantageously incorporated into a variety of products including automobiles, military equipment, musical instruments, etc.

Figure 2:
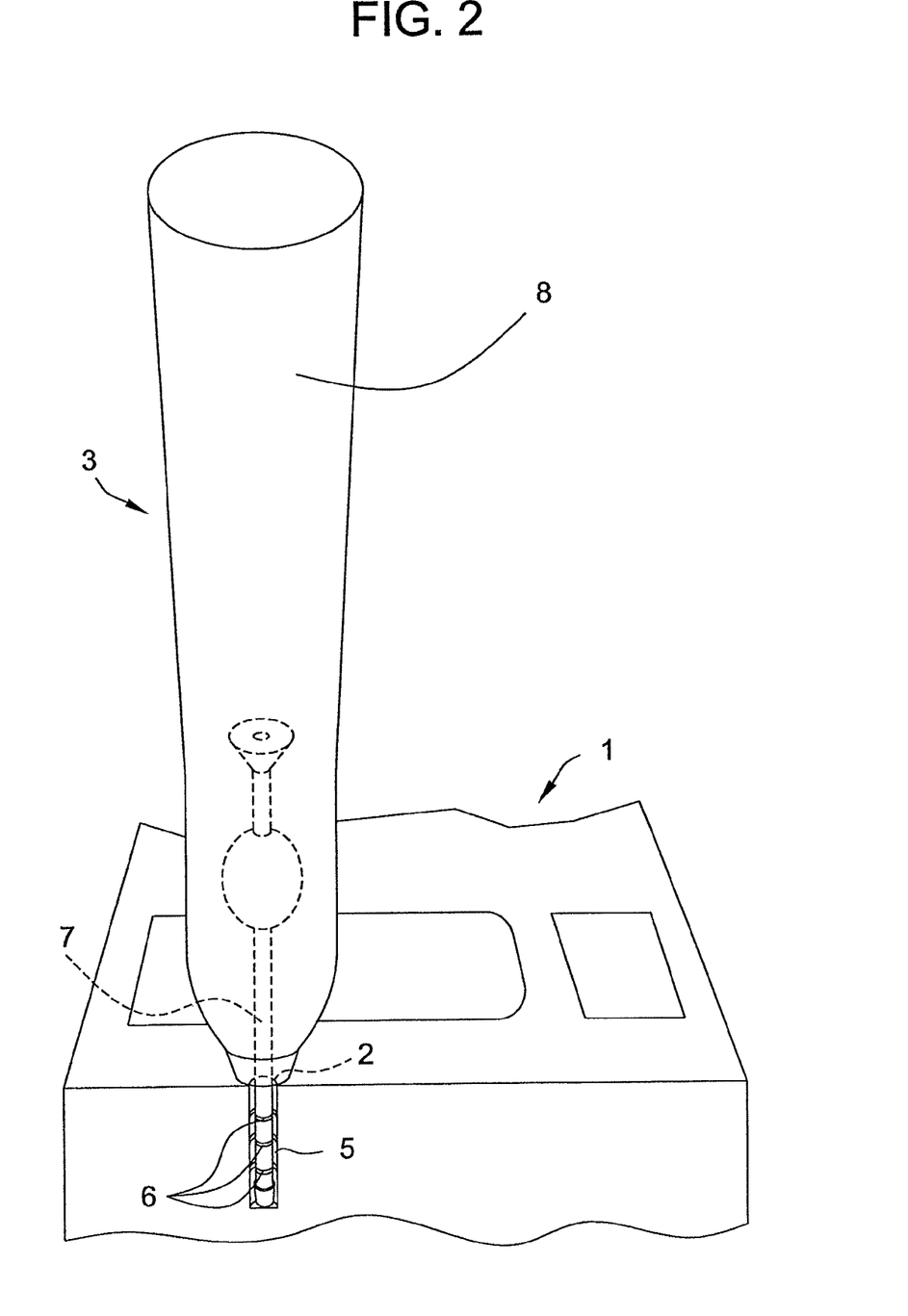
FIG. 2 is a cut-away view of an exemplary port design for the secondary device that includes a small circular hole in its surface into which the male connector of the controller is inserted.

FIG. 2 illustratively depicts a cutaway cross-sectional view of the electronic device 1 and the controller 3. The controller 3 includes a mast 7, that extends from a casing/handle 8. The mast 7 incorporates a set of connection leads 6 that transmit signals between the controller 3 and the electronic device 1. For controller devices that do not include an internal power source of their own, the port and male/female connectors associated therewith are configured to provide power for the controller device 3.

FIG. 2 illustratively depicts internal mechanical and electrical elements of the female connector 5 interface incorporated into the electronic device 1. The female connector 5 has a size and shape that is similar to standard audio jacks, which are already integrated into many portable electronic devices. In alternative embodiments the female connector 5 has an asymmetric (e.g., non-circular) transverse cross-section to facilitate orienting the joystick properly in relation to control structures within the casing/handle 8.

The set of connection leads 6 of the male connector 4 are positioned at a bottom end of the mast 7. The male connector 4 fits inside the female connector 2 of the electronic device 1 in a manner such that the leads 6 engage corresponding leads of the female connector 5. When engaged, the male connector 4 and female connector 5 provide stability for the moveable controller device casing/handle 8. It is noted that FIG. 2 (and other views provided herein) is a simplified/conceptual cutaway view, and shows the female connector 5 in an enlarged form (i.e., with extra space between the mast 7's connection leads 6 and the female connector 5) to show the internal structure of the female connector 5. In practice, the leads 6 of the mast 7 contact corresponding leads of the female connector 5.

For devices that have standardized ports, such as a USB port, an implementation is to use the corresponding, standardized male connector on the controller device. It is further noted that while the female connector opening 2 is located at a top surface of the open electronic device 1 (e.g., a clamshell configuration cell phone), the female connector opening 2 is alternatively located, by way of example, on one of the side (vertical) surfaces of the electronic device 1.

The combination of small surface port and small and simple internal port mechanical and electrical interface, including the fact that there are no moving parts internal to the electronic device 1, address a need to provide an easy and powerful manual controller/joystick in the context of small, mobile devices.

Figure 3:
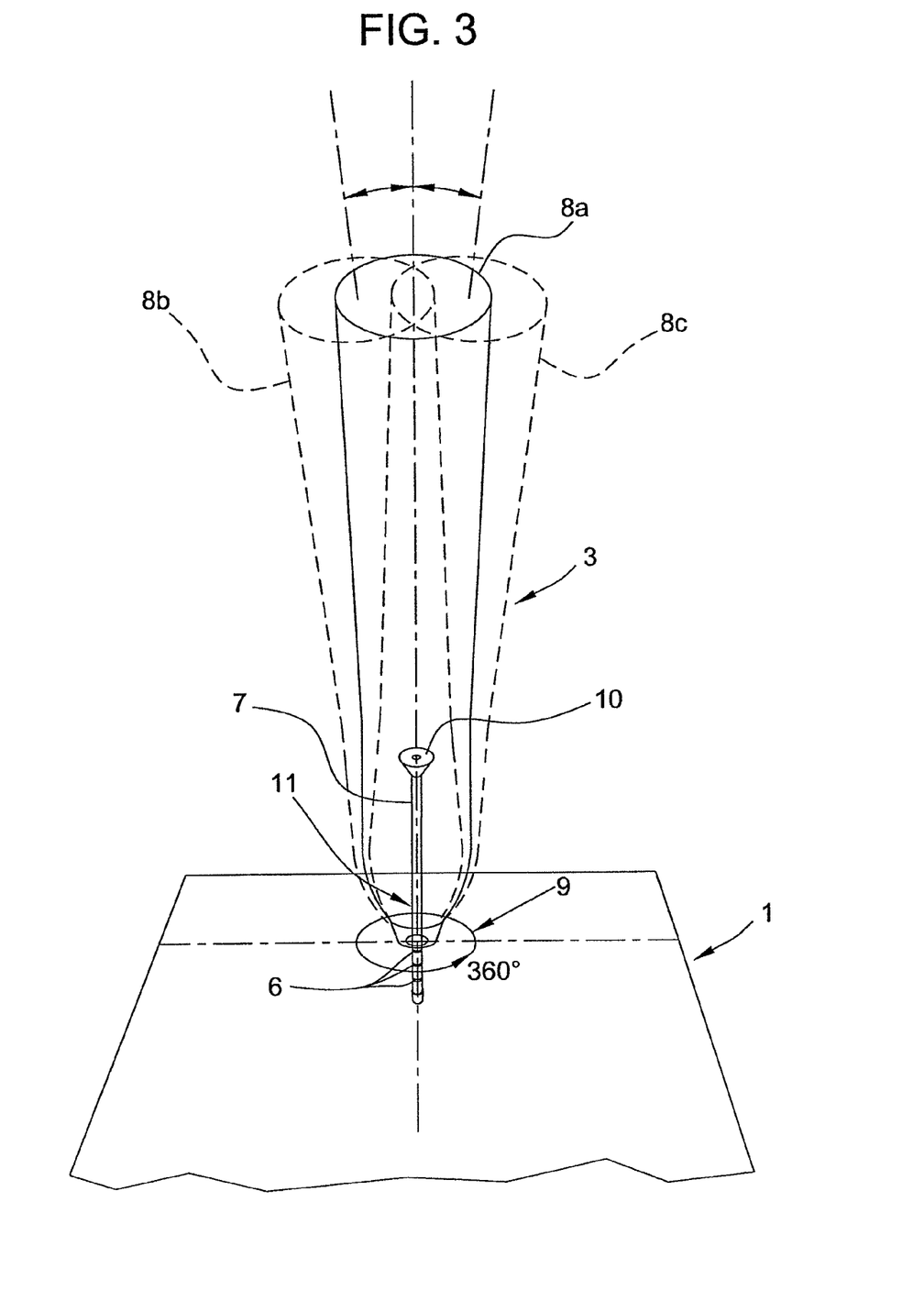
FIG. 3 is a simplified diagram depicting the high degree of pivotability of the casing of the controller in relation to the mast.

FIG. 3 illustratively depicts the pivotable nature of the controller device 3's casing/handle 8 while the mast 7 remains stationary in its engaged relation with the electronic device 1. The degree of pivotability of the casing/handle 8 is determined in part by the relationship of (a) the height and diameter of a mast 7 to the diameter of a hollow cavity inside of the casing/handle 8 at a highest point 10 of the mast 7, and (b) spacial relations between the mast 7 at its lowest point inside the casing 8 and dimensions of an opening of the casing 8 at that point.

Motion initiated by a user of the controller device 3's casing/handle 8 depicted in FIG. 3 is achieved by moving the casing/handle 8 (indicated by three positions including resting point 8a and two displacement positions 8b and 8c) of the controller 3 in relation to the mast 7. The controller device 3 tracks motion of the handle 8 in relation to the non-moving mast by means of electronics that map the relative position of the external casing 8 in relation to the mast 7. FIG. 3 illustrates a range of pivoting angular displacement from a central vertical axis defined by the axis of the mast 7. The angular displacement of the handle 8 about its pivot point 11 around the mast 7 is measured by sensor hardware (not shown in the drawing) of known type for use with a variety of joysticks. The diagram in FIG. 3 is intended to show the potentially substantial degree of pivotability of the handle 8 in relation to the stationary mast 7. The illustrative embodiment also exhibits a range 9 of rotating motion around the central axis defined by the mast 7.

The mast 7 includes a signal transmission mechanism for passing signals from the input device/controller 3 to a connected electronic device 1. In an illustrative implementation the mast 7 is hollow, permitting wires to run through the mast 7 to male connector leads 6 of the input device 3. Alternatively, the mast 7 is partly hollow or has a casing with internal circuitry embedded internally in the same material as the casing or another material for a partly or completely non-hollow mast. In yet another alternative embodiment, the circuitry runs along or around all or part of the surface of the mast. In such embodiment, the conductive lines are carried by a flexible substrate wherein a set of conductors are deposited upon/encapsulated within a flexible polymeric insulating substrate/sheet material.

Figure 4:
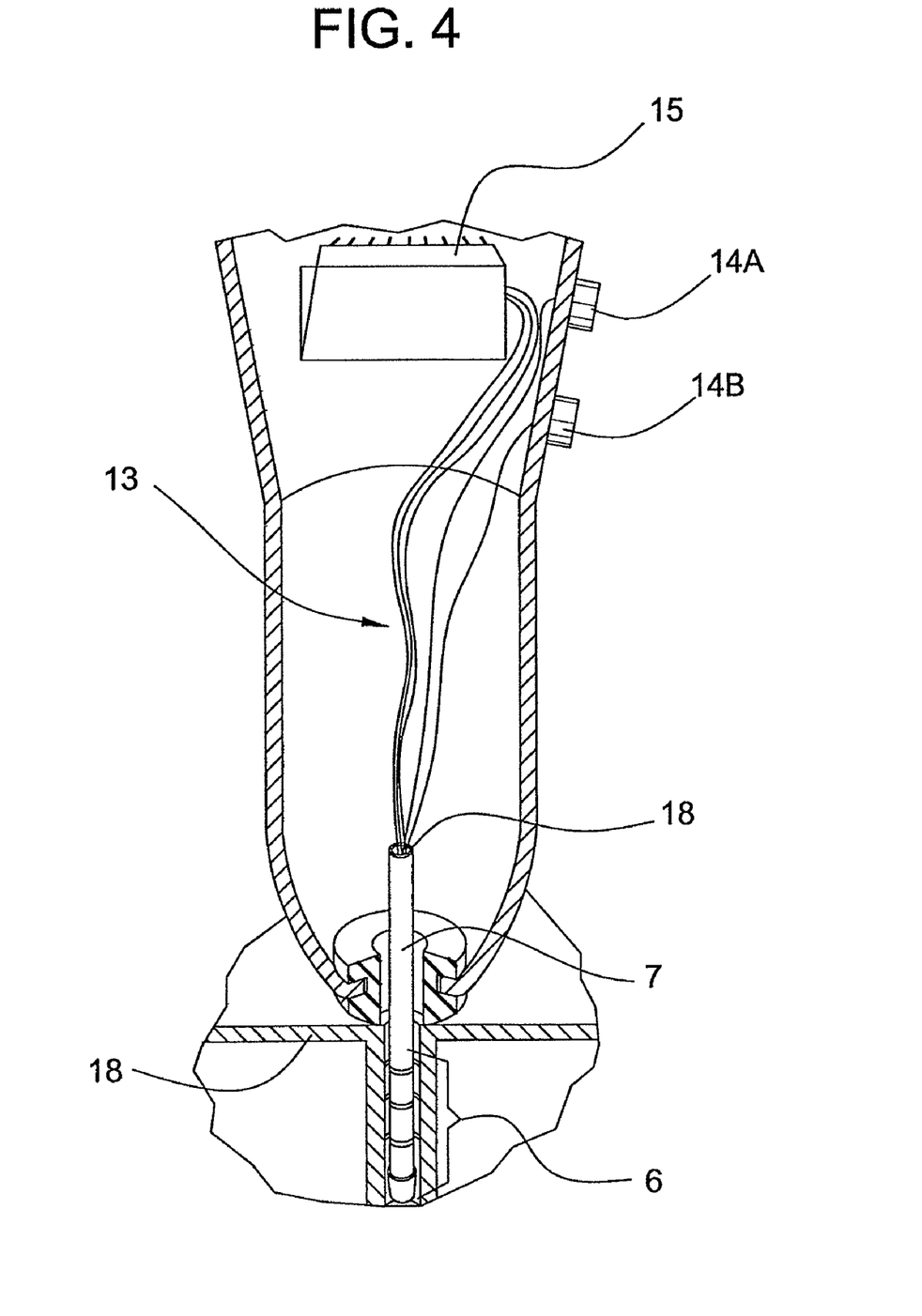
FIG. 4 is a cut-away view of the controller illustratively depicting wiring inside the controller for buttons and an integrated circuit comprising a processor and/or memory chip.

FIG. 4 illustratively depicts a wiring arrangement wherein wires 13 internal to the controller 3 run from external buttons 14a and 14b and control logic/signal processor circuitry and/or memory chip(s) 15 through the mast 7 to the leads 6 of the male connector 4 insertable into the corresponding female connector 5 of the device 1. In the illustrated embodiment, the wires 13 run above the top of an open neck 18 of the mast 7 to the buttons 14a and 14b and the chip(s) 15. In alternative embodiments, the lines from buttons 14a and 14b run to the chips 15 for processing rather than directly to the leads 6. The chips 15 pass the button actuation signals to the leads 6.

By way of example, the external buttons 14a and 14b are configurable to carry out the known "right click" and "left click" functions for known mouse devices. The programmable nature of buttons 14a and 14b facilitates assigning virtually any controller/joystick/gaming/application functionality to them.

Figures 5A, 5B:
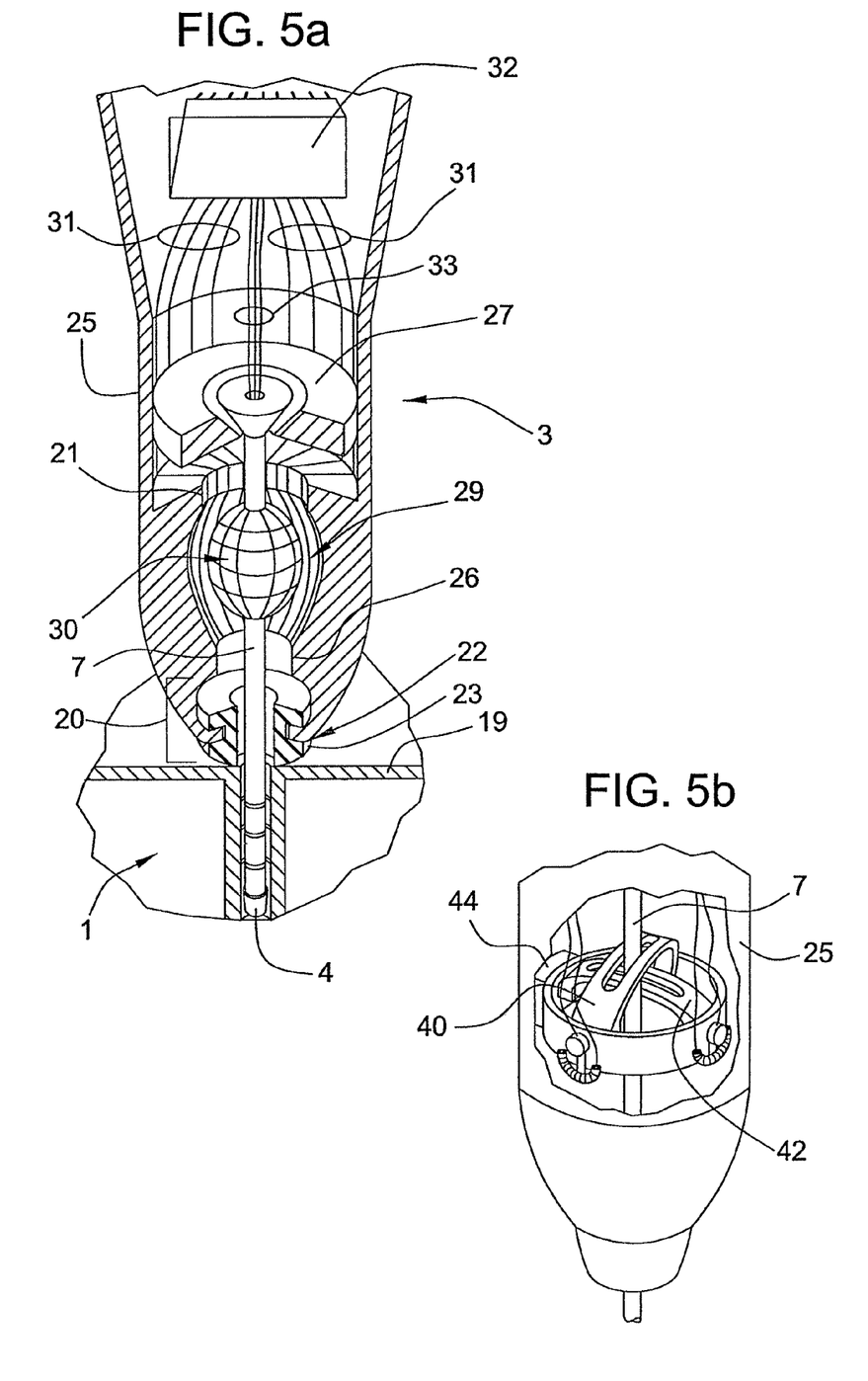
FIGS. 5a and 5b are cut-away views of two exemplary controllers.

Turning to FIG. 5a, a detailed cross-sectional depiction of an exemplary controller arrangement is depicted to show an exemplary arrangement for holding the controller device 3 in proper relation to the mast 7 when the controller 3 is fully engaged with the electronic device 1. A pivot point 20 of an external casing 25 is located proximate to a surface 19 of the electronic device 1. An implementation of the current invention places the pivot point 20 on the order of a millimeter above the surface 19. A compressible tip 23 occupies a space between the surface 19 of the electronic device and a bottom edge 22 of the external casing 25 to allow angular/pivoting displacement of the external casing 25 at the point of the mast 7 adjacent to the surface 19 of the electronic device 1. It also provides a more likely breakage point for the controller device 3 at a point above the surface 19, thereby protecting an opening in the surface 19 of the device 1 where the controller 3 engages device 1 thereby allowing easy removal of the male connector 4 of the device 3 in the event of a breakage at the pivot point 20.

The geometry/dimensions of openings of the external casing 25 (at the pivot point 20 and at the top of the mast 7) in relation to the mast 7 define a range of motion of the external casing 25. In an embodiment of the present invention, the mast 7 is a fraction of the total height of the input device 3 and has a diameter of about 4 mm; with the diameter of the opening of the external casing 25 being about 6 mm at the pivot point 20 and about 8 mm at the top of the mast 7. FIG. 5a illustratively depicts different diameters 21, 22, 26 of open spaces within the external casing 25 in relation to the mast 7, where the adjacent surfaces are held apart from each other by the compressible tip 23 and washer 27.

In some embodiments (see, e.g., FIG. 5b), the mast 7's diameter is substantially the same along its entire length. Alternatively, as shown in FIG. 5a, the mast 7's cross-section varies at different points according to particular functionality implemented at the various points. For example, the diameter at the bottom of the mast 7 is a different diameter to carry out the function of a male connector inside the electronic device 1. A variable diameter mast cross-section permits, for example, a standard size connector for many versions of the input device, while allowing different size external casings.

In an implementation of the male/female connector, the male/female connector between the controller 3 and device 1 is configured to permit a user to insert mast 7's male connector 4 in any orientation in 360 degrees around the vertical axis of the connector. This permits the user to easily insert the connector without having to ascertain a correct orientation. This arrangement also permits the user to twist the input device around its vertical axis when the input device is fully inserted into its port. This gives the user the ability to customize the orientation of the device comfortably for the user's fingers, hand and wrist. Alternatively, a limited set of rotational orientations (e.g., two, four) are supported—i.e., the female/male connectors are square/rectangular shaped.

By way of example, the external casing 25 is self-centering around the mast 7. This is accomplished by means of the washer 27 made of rubber, foam or plastic or other compressible material located at or near the top of the mast 7, and that is formed to extend to conform to the internal surface of the casing 25. If the user releases directional pressure on the outside surface of the external casing 25, then the washer 27 causes the external casing 25 to center itself on the vertical axis of the mast 7. The washer 27 is either a solid disk of material (compressible or non-compressible) or a disk with spokes (compressible or non-compressible) or holes depending on the need for reducing weight and other physical characteristics of the washer. Furthermore, the structure/composition of the washer 27 is potentially governed by the function(s)/role(s) of the washer in the controller assembly (e.g., measuring relative strain/displacement).

FIG. 5a illustratively depicts an exemplary design wherein a compressible washer 27 facilitates self-centering and positioning of conductive sensor matrix surfaces 29, 30 relative to each other that are located near the top of the mast 7. FIG. 5a also illustratively depicts the upper self-centering compressible material 27 and the lower self-centering compressible tip 23. These materials also hold the conductive matrix surfaces 29, 30 apart until they are compressed by means of movement of the casing 25, and permit pivoting movement of the casing 25 in relation to the mast 24.

The controller 3 in FIG. 5a also includes a set of wires 31 (or other suitable set of signal conductors such as, for example, thin film conductors, flexible circuits comprising a flexible substrate and printed circuit wiring, and printed circuits) connecting the conductive matrix 29 on a surface on the inside wall of the casing 25 to a processor 32. At least a second line connects the surface 30 to the processor 32 which itself has a set of wires 33 that lead through the mast 7 to the male connector leads at a portion of the mast 7 that engages a female connector of the electronic device 1.

The compressible tip 23 located at the bottom of the external casing 25 positions the inside surface of the bottom portion 22 of the external casing 25 and the mast 7 in a specific base state relative to one other when the external casing 25 is in its centered/relaxed position relative to the mast 7. When a user manipulates the casing 25 from its relaxed position, the washer 23 permits the inside surface of the casing 22 to move relative to the mast 7. The relative position of the mast 7 and casing 25 is detected by the internal sensor matrix including components 29 and 30. The signals generated by the components 29 and 30 are received and processed by the processor 32. The processor 32 thereafter passes a control signal to the electronic device 1 via the wires 33 which terminate at male connector leads at the base of the mast 7 that engage corresponding female leads within the device 1.

With further reference to FIG. 5a, the washer 27 and the compressible tip 23 potentially have different compression coefficients depending on which axis is being compressed. This permits a vertical compressibility that differs from horizontal compressibility (in relation to the mast 7 and casing 25). A material or structure with an inelastic vertical compression/decompression construction permits a user to insert and detach the input device without or with less stretching or compressing the material thereby making insertion and detachment easier for the user and with less chance of breakage for the device. For instance, an upper washer with a radial structure comprised of spokes constructed in the fashion of shock absorbers permits pivoting the external casing inwards towards the mast, but does not permit vertical movement of the casing 25 in relation to the mast 7. An alternative to the compressible tip 23 structure is a swivel (e.g., ball) joint located at the pivot point 20 that permits pivoting the casing 25 with respect to the mast 7.

A variety of horizontal compressibilities offer the ability to tailor the controller device for specific uses. A highly compressible material or structure provides for a highly sensitive input device. Alternatively, a compression system that is adjustable by the user gives the user control over the motion sensitivity of the input device. This is implemented, for instance, by using an air chamber having a pressure that is adjusted to have more or less pressure by the user, or by using an electrical current that changes the compression coefficient of the material. This is analogous to setting the resistance of keys to finger pressure on a keyboard in that this controls how much finger pressure it takes to offset the external casing 25 from a relaxed vertical position in relation to the mast 7. Additionally, the compressibility setting could be changed by a software application on a real time basis providing a force-feedback responsiveness to the user of the device.

An implementation of the motion detection between the external casing and the mast is to have conforming three-dimensional surfaces 29, 30 of conductive elements (separated by a gap or a layer of non-conductive fluid or a membrane). When the surfaces 29, 30 come into contact with each other at various points as the user moves the external casing 25 in relation to the mast 7, the point or points of contact create signals that are processed by the processor 32 (or other suitable logic) to determine the position/direction/speed of movement intended by the user.

FIG. 5a illustratively depicts a simple implementation wherein the conductive surfaces 29, 30 are curved in relation to each other. In the illustrative example, the conductive surface 30 is solid while the surface 29 comprises an array of individual conductive elements. Thus, if the casing 25 is moved sufficiently from a relaxed position, then the two conductive surfaces 29 and 30 contact each other at a particular location. A signal is passed from the conductive surface 29 to a processor 32 indicative of the contact point. The processor 32 converts the signals received from the conductive sensor matrix of surface 29 to at least a directional signal that is transmitted to the electronic device 1 to which the mast 7 is connected. In alternative embodiments, the complimentary surfaces of the conductor surface 30 and the matrix surface 29 are in substantially continuous contact such that direction, speed and/or displacement of the joystick are potentially registered over time.

By way of example, the conductive surfaces motion measurement system illustratively depicted in FIG. 5a is carried out by an inverted version of current systems used in joystick controllers. The current systems have a first fixed surface comprising a set of elements that make up a conductive matrix disposed within controller base contained within underlying device. A joystick is attached to a second convex conductive surface. The second convex conductive surface moves in relation to the first fixed surface. An example of such controller sensor arrangement that is suitable for incorporation into the current system is a TARGUS Model PAUM3O. However, in contrast to the TARGUS PAUM30, the motion measurement system illustrated in FIG. 5a inverts the component arrangement such that the conductive surface 30 attached to the mast 24 is fixed (the analog to the moveable second convex conductive surface of the current system referenced in the preceding sentence), and the conductive surface 29 attached to the casing 25 (the analog to the fixed first surface conductive matrix referenced above) is concave and movable and attached to the inside surface of the controller device's external casing 25.

Figure 6:
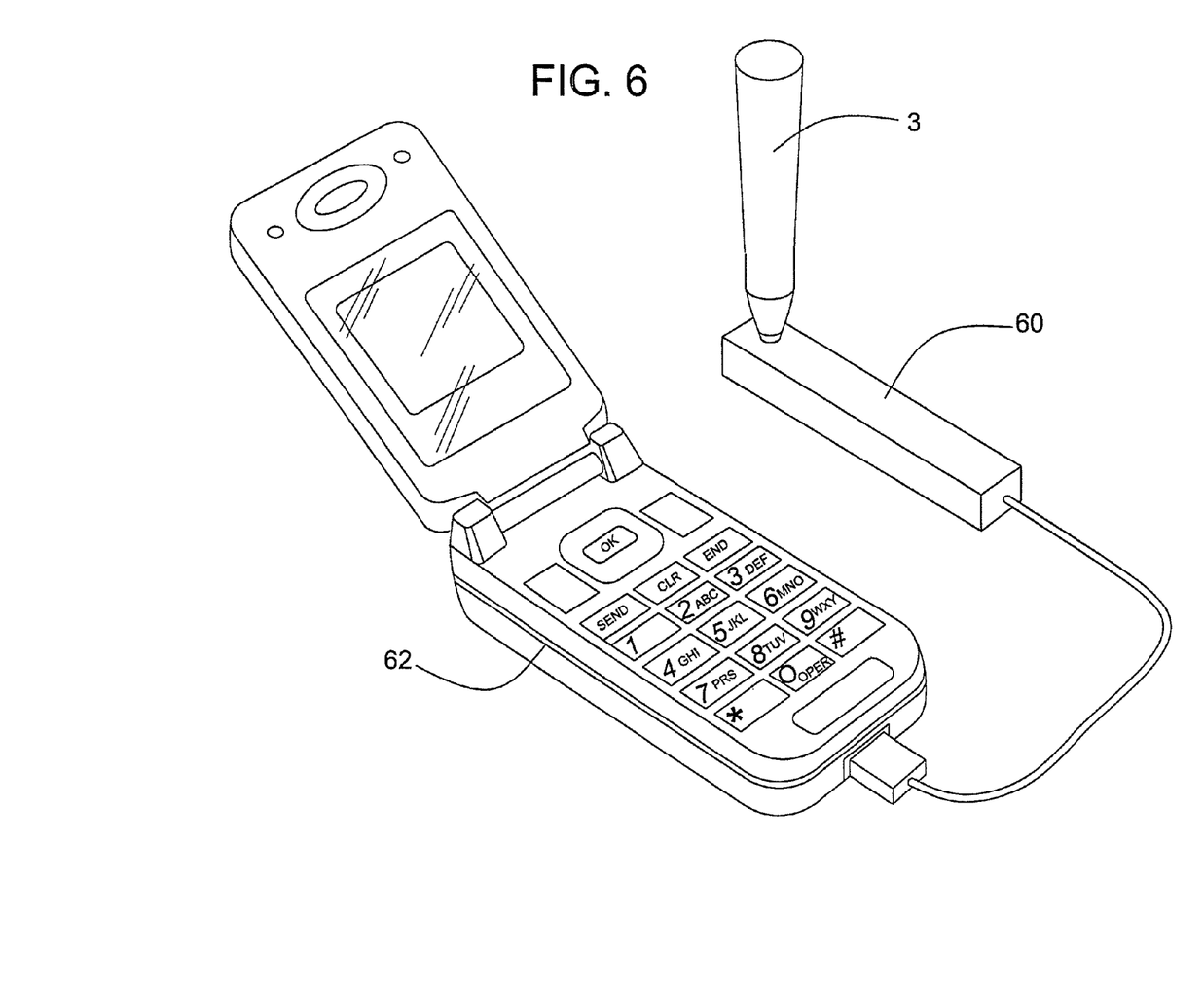
FIG. 6 illustratively depicts the controller inserted into an adapter which connects (wired or wirelessly) to a secondary device.

As alternatives to the conductive surfaces system for motion detection and translation, any system (such as strain gauges, optical motion sensors and other systems) for measuring relative motions of two surfaces in gaming joysticks or cursor control mechanical or electrical systems is used. For example, in the alternative embodiment depicted in FIG. 5b, the mast 7 is used to rotate to orthogonally arranged bridges 40 and 42 that rotate when the casing 25 is moved in relation to the mast 7. Potentiometers associated with each of the two orthogonally arranged bridges 40 and 42 transform the positions into an analog signal magnitude. A ring 43 that holds the bridges 40 and 42 is fixedly attached to the casing 25 via a mount 44. Thus, the sensor assembly including the bridges 40 and 42, and the ring 43 move with the casing of the controller device 3 while the mast 7 remains fixedly positioned with respect to a female connector port on an attached electronic device (or adaptor as shown in FIG. 6) The signal is transformed into a position by the processor 32, and a corresponding signal is transmitted by the controller 3 to the device 1. In yet another alternative example, measuring angular displacement of the joystick casing (where at least the base of the mast 7 remains stationary) is implemented using a multi-directional joint or any system that permits/registers controlled movement of the external casing to all supported compass points in relation to the mast.

For controller devices with functionality that requires memory and processor chips, power supplies or other components in addition to the motion sensing system, the external casing includes one or more payload shelves with wiring that connects through the mast 7. The payload shelves hold such electronics as memory chips, processors and power supplies. An alternative design includes payload bays that permit insertable electronics, such as swappable memory cards or power sources such as batteries.

The controller device incorporates software that aligns the device's movement processing along a north/south axis of the choice of the user by means of the user performing an initial forward and back movement of the controller device along the axis chosen by the user each time the device is connected to an electronic device. The user resets the north/south motion axis after the input device is inserted. This enables the device to be inserted in any orientation and to be oriented by the user around the vertical axis of the mast for greatest comfort by the user, and still provide accurate and intuitive movement/position signals to or through the electronic device.

Turning to FIG. 6, the controller device 3 connects to a range of electronic devices, including mobile phones, laptops, keyboards, PDAs, cars, planes, TV or home entertainment remote controls, gaming controllers, portable and mobile computing devices and even an adapter for an electronic device (see, e.g., FIG. 6), etc. Connecting the input device to an adapter 60 facilitates physically connecting the controller 3 to legacy electronic devices that do not have ports specifically configured for the male connector of the controller device. The adapter 60 connects to a legacy electronic device 62 through a wired or wireless connection. By way of example, the wireless connection is implemented using the Bluetooth or WiFi wireless (or unlicensed wireless network) communications systems. In the illustrative example, the adaptor 60 connects to the device 62 through a USB connection.

Figure 7A:
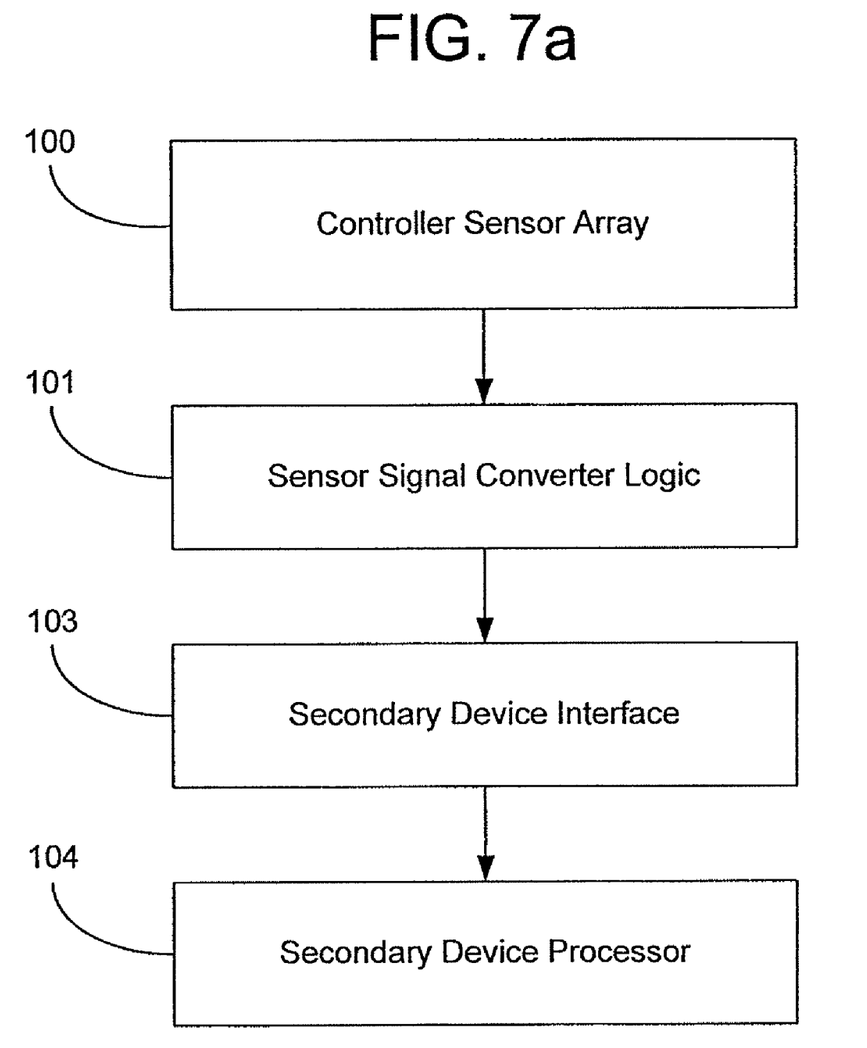
FIGS. 7a and 7b summarize exemplary signal paths from a user's manipulation of the controller to a processor that interprets and applies the input to a currently active application.

Having provided a number of physical examples of a controller for use in a confined place, turning to FIG. 7a, a set of stages represent the functional relationships between various components of the controller and interface logical/electrical components of a system. The schematically represented set of stages includes a sensor array 100 that translates relative motion of the mast 7 and casing 25 of the controller 3 into a first set of signals. The first set of signals is sent to signal converter logic 101 in the processor 32. The signal converter logic 101 converts the first set of signals into a second set of signals that represent commands (e.g., cursor directions, velocity vector signals, left click, right click, etc.). The second set of signals are transmitted from the signal converter logic 101 of the controller 3 directly to a controller/electronic device interface 103 which provides the electrical signal connection interface that passes the second set of signals to an electronic device processor 104. The schematic in FIG. 7a is merely a general representation of circuitry/logic, and does not preclude implementation-specific circuitry designs such as wireless connections (e.g., Bluetooth wireless communications between the controller and the electronic device) or specific industry-standard connections (e.g., the USB industry standard) and two-way signal transmission between the electronic device and the controller.

Figure 7B:
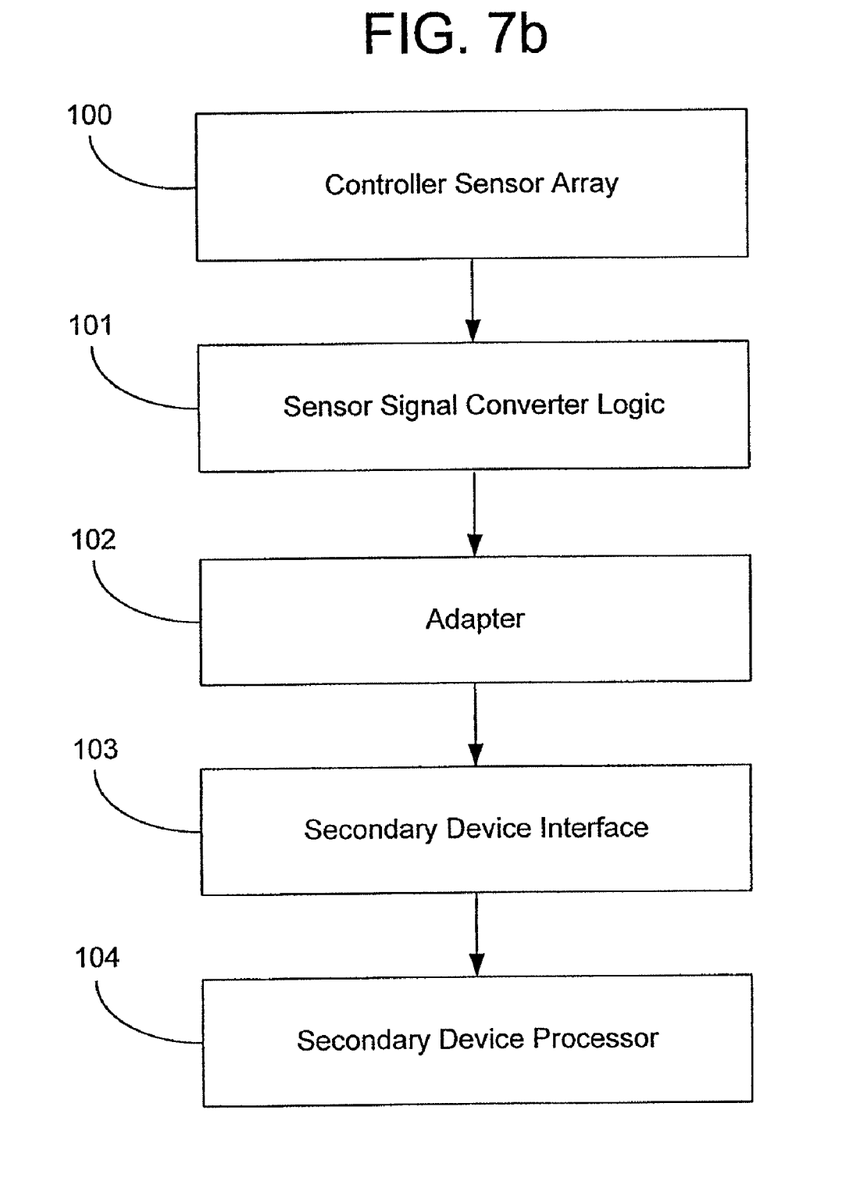

In FIG. 7b, another schematic functional representation of stages of the controller 3 and logical/electrical interface components is presented wherein the controller connection to the electronic device is carried out in-part by way of an adapter stage 102. The schematic includes the sensor array 100 that translates relative motion of the mast/casing of a controller 3 into a first set of signals that are sent to signal converter logic 101. The converter logic 101 converts the first set of signals into a second set of signals that represent commands (e.g., cursor directions, velocity vector signals, left click, right click, etc.). The second set of signals pass to the controller/electronic device interface 103 (which provides the connection to transmit the signals to an electronic device processor 104) by way of an adapter 102. The schematic in FIG. 7b is merely a general representation of circuitry/logic relationships, and does not preclude implementation-specific circuitry designs, and does not preclude other circuitry designs, such as wireless connections (e.g., Bluetooth wireless communications between the controller and the electronic device) or specific industry-standard connections (e.g., the USB industry standard) and bi-directional signal transmission between the electronic device 1 and the controller 3.

It is noted that the controller device 3 including, by way of example, on-board non-volatile memory, is capable of storing installed software, such as a video game. In a particular embodiment, a software application is pre-installed, and the controller device 3 is vended/distributed with the embedded application software. Furthermore, the controller device 3 and/or software application permits the electronic device 1 to execute the software application directly from the controller device 3 (similar to known portable game hardware/software arrangements). Furthermore, a driver potentially defines a customized configuration for the controller device 3 when the electronic device 1 executes the software application. Thus, in the exemplary embodiment there is no need to download or install software from external sources, nor is it necessary to configure the controller 3 to synchronize control signals provided by the controller device 3 (in response to user-actuation of the controller 3) to the electronic device 1 with a software application provided by the controller device 3.

The above-described method and apparatus for providing application software to an electronic device 1 via a controller device 3 provides a user-friendly mode of providing access to software and media for small, mobile devices which may have limited non-volatile memory and/or small screens on which it is potentially difficult to manage large numbers of applications. Furthermore, the above-described pre-loaded driver, defining relations between user-actions and resulting control instructions carried out by the electronic device 1 executing the software application, avoids the need to separately configure the controller 3 for the associated software application. The aforementioned synchronization/configuration step for the controller and downloaded application avoids a potentially formidable hurdle for users—particularly a less-sophisticated, large population of potential users that is not part of the heavy gaming demographic.

The structures, techniques, and benefits discussed above, for illustrative controller devices embodying the present invention, are exemplary. In view of the many possible embodiments to which the principles of this invention may be applied, it should be recognized that the embodiments described herein with respect to the drawing figures are meant to be illustrative only and should not be taken as limiting the scope of invention. For example, geometries of the cavity, consisting of the space between and including the internal surfaces of a controller casing and external surfaces of a controller mast vary based on numerous factors, such as type of internal components, range of desired motion, and the type and sophistication of motion measurement systems. The relative heights of the mast and the casing (e.g., the mast may extend above the top of the casing) also vary in accordance with particular embodiments. Materials used to position/separate the controller's mast and casing at a pivot point and at an upper position on the mast also vary. The structure and shape of such materials may vary. For example, a compression coefficient of a material used at the upper position on the mast to maintain the position of the casing relative to the mast varies in particular embodiments. Furthermore, the positioning structure potentially comprises a strain gauge, for example, thereby combining componentry used to measure movement of the casing relative to the mast and the componentry used to position the mast and the casing relative to each other. There are also multiple various materials and structures for implementing/creating a pivot point for the mast/casing combination at a point proximate to an opening on a surface of an electronic device into which a connection end of the controller fits. Such alternative structures include, by way of example, a ball bearing assembly, a ball and socket assembly or a universal or multi-directional mechanical joint. The materials comprising the casing and the mast include, for example plastics, composites, resins, metals, etc. Therefore, the invention as described herein contemplates all such embodiments as may come within the scope of the following claims and equivalents thereof.

What is claimed is:

1. A controller device for use with an electronic device, comprising:
   an internal rigid mast structure, including, at one end, a connector, including a set of signal leads, for insertion within a complimentary fixed receptacle of the electronic device for passing signals between the controller device and the electronic device;
   a user movable external casing, wherein the internal rigid mast structure and the user movable external casing are flexibly engaged, thereby providing relative positioning of the user movable casing in relation to the fixed mast structure; and
   sensor circuitry for providing a signal indicative of the relative positioning of the user movable casing and fixed mast structure.

2. The controller device of claim 1 wherein a flexible engagement structure is used to flexibly engage the fixed mast and the user movable casing.

3. The controller device of claim 1, further comprising converter logic disposed within the casing for translating the signal indicative of relative positions into user interface control signals transmitted via the connector to the fixed receptacle.

4. The controller device of claim 1 wherein the fixed receptacle is incorporated within a programmable portable computing device.

5. The controller device of claim 1 wherein the sensor circuitry comprises first and second conductive surfaces that trigger an electrical signal at distinct relative positions, wherein the first conductive surface is associated with the casing and a second conductive surface is associated with the fixed mast.

6. The controller device of claim 5 wherein the first and second conductive surfaces conform to each other, the controller further comprises resilient engagement structures defining relative movement between the mast and the casing, and the resilient engagement structures are located proximate to a top of the mast and proximate to the proximal opening of the user movable casing.

7. The controller device of claim 5 wherein a mast diameter at a point above the first and second conductive surfaces is less than a cavity diameter within the user movable casing at the same point within the controller device, a resilient deformable material is attached to the mast at the point, the material extends to an inner wall of the cavity, thereby holding the user movable casing in a position with its vertical axis parallel to the vertical axis of the mast and holding the conductive surfaces apart until a force applied to the outside of the user movable casing causes the user movable casing to pivot in relation to the mast at the pivot point.

8. The controller device of claim 1 wherein the fixed mast comprises a tube permitting passage of wires from within the casing to the connector.

9. The controller device of claim 1 wherein the mast is hollow and has wires entering the rigid support structure above the conductive surfaces.

10. The controller device of claim 1 wherein the mast is a solid piece of one or more materials with integral wires running to the connector signal leads.

11. The controller device of claim 1 wherein flexible circuits are attached to an exterior surface of the mast, and wherein the flexible circuits signally connect the connector signal leads to electronic components on the controller device.

12. The controller device of claim 1 wherein the mast at the pivot point is of a diameter less than the inside diameter of the user movable casing at the pivot point and a resilient flexible material fills a gap permitting the user movable casing to move in relation to the mast.

13. The controller device of claim 1 wherein the mast at the pivot point is of a diameter less than the inside diameter of the user movable casing at the pivot point and the mast and user moveable casing form a multi-directional mechanical joint.

14. The controller device of claim 1 wherein a mast diameter at a point above the pivot point less than a diameter of a cavity within the user movable casing at the same point above the pivot point and a resilient flexible material is attached to the mast and extends to an inner wall of the cavity of the user movable casing.

15. The controller device of claim 1 wherein a payload located inside the user movable casing includes one or more electronic components taken from a set including:
a power supply,
a processor chip, and
a memory chip.

16. The controller device of claim 1 wherein the user movable casing includes a removable card slot that permits a user to swap user-exchangeable cards on the controller device.

17. The controller device of claim 1 wherein one or more finger-actuated control elements are located outside of the user movable casing.

18. The controller device of claim 1 wherein the connector has a circular cross section.

19. The controller device of claim 1 wherein the input device, after insertion into a port, allows a user to perform an orientation movement along the axis of choice by the user that determines the compass points for the movement processor that assigns values to movements of the user movable casing of the input device.

20. The controller device of claim 1 further comprising an adaptor, wherein the connector connects to the adaptor, and wherein the adaptor connects to the electronic device.

21. The controller device of claim 1 wherein a software application is installed in the controller device, and a configuration definition specifies a functional relationship between control signals provided by the controller device via the signal leads and the software application.

22. A controller device for use with an electronic device, comprising:
an internal rigid mast structure, including, at one end, a connector, including a set of signal leads, for insertion within a complimentary fixed receptacle of the electronic device for passing signals between the controller device and the electronic device;
a user movable external casing, including a finger-actuated control element located on the exterior of the user movable casing
wherein the fixed mast structure and the user movable casing are flexibly engaged, thereby providing relative positioning of the user movable casing in relation to the fixed mast structure; and
sensor circuitry for providing a signal indicative of the relative positioning of the user movable casing and fixed mast structure and for providing a signal indicative of the actuation of the finger-actuated control element.

23. The controller device of claim 22 wherein a software application is pre-installed in the controller device, and a configuration definition specifies a functional relationship between control signals provided by the controller device via the signal leads and the software application.

* * * * *